US008768390B2

(12) United States Patent
Lien et al.

(10) Patent No.: US 8,768,390 B2
(45) Date of Patent: Jul. 1, 2014

(54) SURROUNDING CELL MONITORING METHOD

(75) Inventors: Jui-Ping Lien, Taipei (TW); Hung-Yueh Chen, Taipei (TW); Meng-Lin Wu, Keelung (TW); Chun-Sheng Lee, Zhubei (TW)

(73) Assignee: Mediatek Inc., Hsin-Chu (TW)

( * ) Notice: Subject to any disclaimer, the term of this patent is extended or adjusted under 35 U.S.C. 154(b) by 184 days.

(21) Appl. No.: 13/279,702

(22) Filed: Oct. 24, 2011

(65) Prior Publication Data
US 2013/0102340 A1  Apr. 25, 2013

(51) Int. Cl.
H04B 15/00 (2006.01)

(52) U.S. Cl.
USPC .......................................... 455/501

(58) Field of Classification Search
CPC ............................. H04W 36/08; H04W 52/24
USPC ......... 455/453, 446, 560–561, 574, 443, 444, 455/453.562
See application file for complete search history.

(56) References Cited

U.S. PATENT DOCUMENTS

| | | | |
|---|---|---|---|
| 7,680,450 B2 * | 3/2010 | Moscovitz et al. | 455/1 |
| 8,121,622 B2 * | 2/2012 | Han et al. | 455/456.5 |
| 2007/0224963 A1 * | 9/2007 | Moscovitz et al. | 455/296 |
| 2009/0011779 A1 * | 1/2009 | MacNaughtan et al. | 455/456.6 |
| 2009/0042577 A1 * | 2/2009 | Tolli et al. | 455/436 |
| 2009/0111381 A1 * | 4/2009 | Johnson et al. | 455/63.4 |
| 2010/0105336 A1 * | 4/2010 | Attar et al. | 455/67.11 |
| 2010/0113063 A1 | 5/2010 | Han et al. | |
| 2011/0096706 A1 * | 4/2011 | Ramasamy et al. | 370/310 |

OTHER PUBLICATIONS

TW Office Action dated Dec. 23, 2013.

* cited by examiner

*Primary Examiner* — Andrew Wendell
*Assistant Examiner* — Maryam Soltanzadeh
(74) *Attorney, Agent, or Firm* — McClure, Qualey & Rodack, LLP

(57) ABSTRACT

A surrounding cell monitoring method is applied in a mobile terminal wirelessly communicating with a first cell through a first target channel. The surrounding cell monitoring method includes the steps of: determining whether adjacent channel interference (ACI) of the target channel exists; determining whether a first power level of the adjacent channel is greater than a second power level of the target channel by a threshold difference when the ACI exists, when the ACI does exist; determining whether an adjacent BSIC of the adjacent channel can be decoded when the first power level is greater than the second power level by the threshold difference; and skipping an operation of decoding a target BSIC of the target channel when the adjacent BSIC of the adjacent channel can be decoded successfully.

15 Claims, 5 Drawing Sheets

SURROUNDING CELL MONITORING METHOD

BACKGROUND OF THE INVENTION

1. Field of the Invention

The invention relates in general to a surrounding cell monitoring method, and more particularly to a surrounding cell monitoring method capable of enhancing power performance of a mobile terminal using thereof.

2. Description of the Related Art

Wireless communications networks, such as code division multiple access (CDMA) networks, time division multiple access (TDMA) networks, and frequency division multiple access (FDMA) network, are widely deployed to provide various communications services such as voice, packet data, broadcast, messaging, and so on. In general, a terminal, such as a cell phone, a tablet, a personal digital assistant (PDA), a portable game console, etc, is capable of communicating with multiple wireless networks such as a Global System for Mobile Communications (GSM) network.

The wireless network typically includes many cells, referring to as base stations or the coverage areas of the base stations. Conventionally, a terminal, take a cell phone for example, typically communicates with a serving cell at any given moment but may periodically monitor the surrounding cells, e.g. other cells nearby. For example, the surrounding cells monitoring operation allow the terminal to ascertain whether any other cell is better than the current serving cell; if so, then the terminal is able to switch to the other cell and receive service from that cell.

Generally, it takes lots of computation effort for the terminal to execute the surrounding cell monitoring operations, such that the power deficiency issue of the terminal due to the power-consuming surrounding cell monitoring operations is accordingly raised. Thus, how to provide a decent surrounding cell monitoring method capable of reducing computation effort needed for surrounding cell monitoring operations and accordingly resolving the power deficiency issue of the terminal has become a prominent object for the industries.

SUMMARY OF THE INVENTION

According to a first aspect of the present invention, a surrounding cell monitoring method applied in a mobile terminal wirelessly communicating with a cell through a target channel, is provided. The surrounding cell monitoring method includes the steps of: determining whether adjacent channel interference (ACI) of the target channel exists; determining whether a power level of the adjacent channel is greater than a power level of the target channel by a threshold difference when the ACI exists, when the ACI does exist; determining whether the BSIC of the adjacent channel can be decoded when the power level of the adjacent channel is greater than the power level of the target channel by the threshold difference; and skipping an operation of decoding a target BSIC of the target channel when the adjacent BSIC of the adjacent channel can be decoded successfully.

According to a second aspect of the present invention, a surrounding cell monitoring method applied in a mobile terminal, wirelessly communicating with a cell through a target channel, is provided. The surrounding cell monitoring method includes the steps of: determining whether a counted number, indicating times for trying to decoding the target BSIC, is greater than a threshold; decoding the target BSIC when the counted number is not greater than the threshold; determining whether the target BSIC is decoded successfully; having the counted number ascending by 1 when the target BSIC is not decoded successfully, wherein, after the step of having the counted number ascending by 1, the surrounding cell monitoring method proceeds to the step of determining whether the counted number is greater than the threshold; determining whether a penalty time, started from a time point on which the target BSIC was decoded, has been reached when the counted number is greater than the threshold; and skipping the target BSIC decoding operation when the penalty time has not been reached.

According to a third aspect of the present invention, a surrounding cell monitoring method applied in a mobile terminal, wirelessly communicating with a cell through a target channel, is provided. The surrounding cell monitoring method includes the steps of: determining whether the target BSIC is recorded in a BSIC database; obtaining the target BSIC in a manner of referencing the BSIC database and skipping the operation of decoding a target BSIC accordingly when the target BSIC is recorded in the BSIC database; decoding the target BSIC when the target BSIC is not recorded in the BSIC database; and recording the decoded target BSIC in the BSIC database.

The invention will become apparent from the following detailed description of the preferred but non-limiting embodiments. The following description is made with reference to the accompanying drawings.

DETAILED DESCRIPTION OF THE INVENTION

First Embodiment

Figure 1:
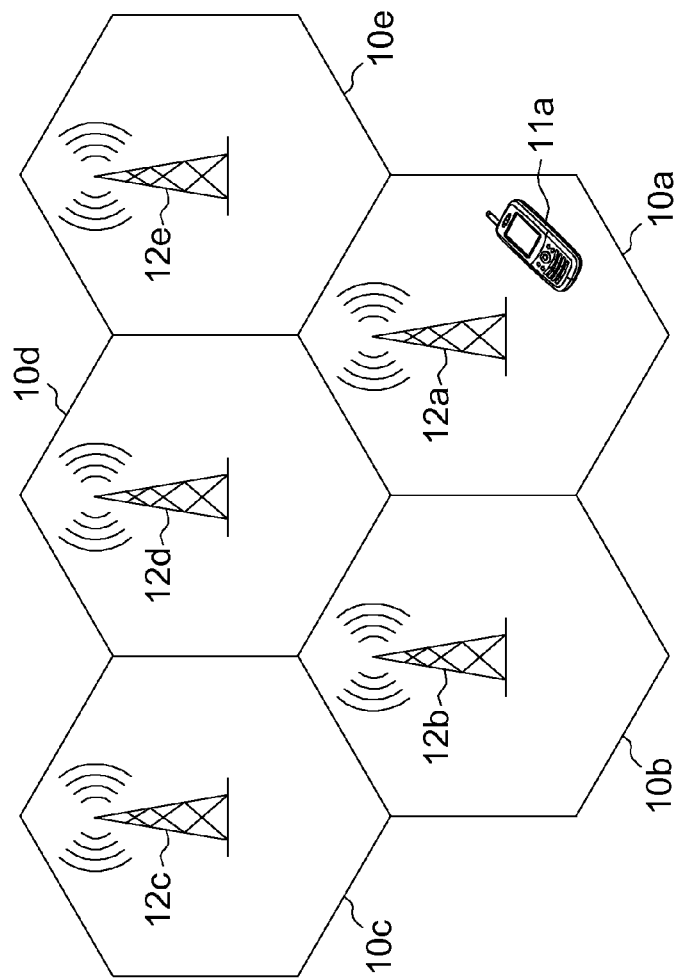
FIG. 1 is a schematic diagram of a communications system employing the surrounding cell monitoring method.

Referring to FIG. 1, a schematic diagram of a communications system employing the surrounding cell monitoring method according to a first embodiment of the invention is shown. The communications system 1 includes base stations 12a, 12b, 12c, 12d, and 12e and a mobile terminal 11a. The base stations 12a-12e respectively correspond to cells (i.e. coverage areas) 10a, 10b, 10c, 10d, and 10e, to which the base stations 12a-12e respectively irradiate communications signals and communicate with mobile terminals therewithin, so as to provide wireless telecommunication service. For example, the mobile terminal 11a is within the cell 10a, and has a subscriber identity module (SIM). The base station 12a, working as a target cell of the mobile terminal 11a, accordingly irradiates communications signals and communicates with the mobile terminal 11a through a target channel (not shown in FIG. 1).

Figure 2:
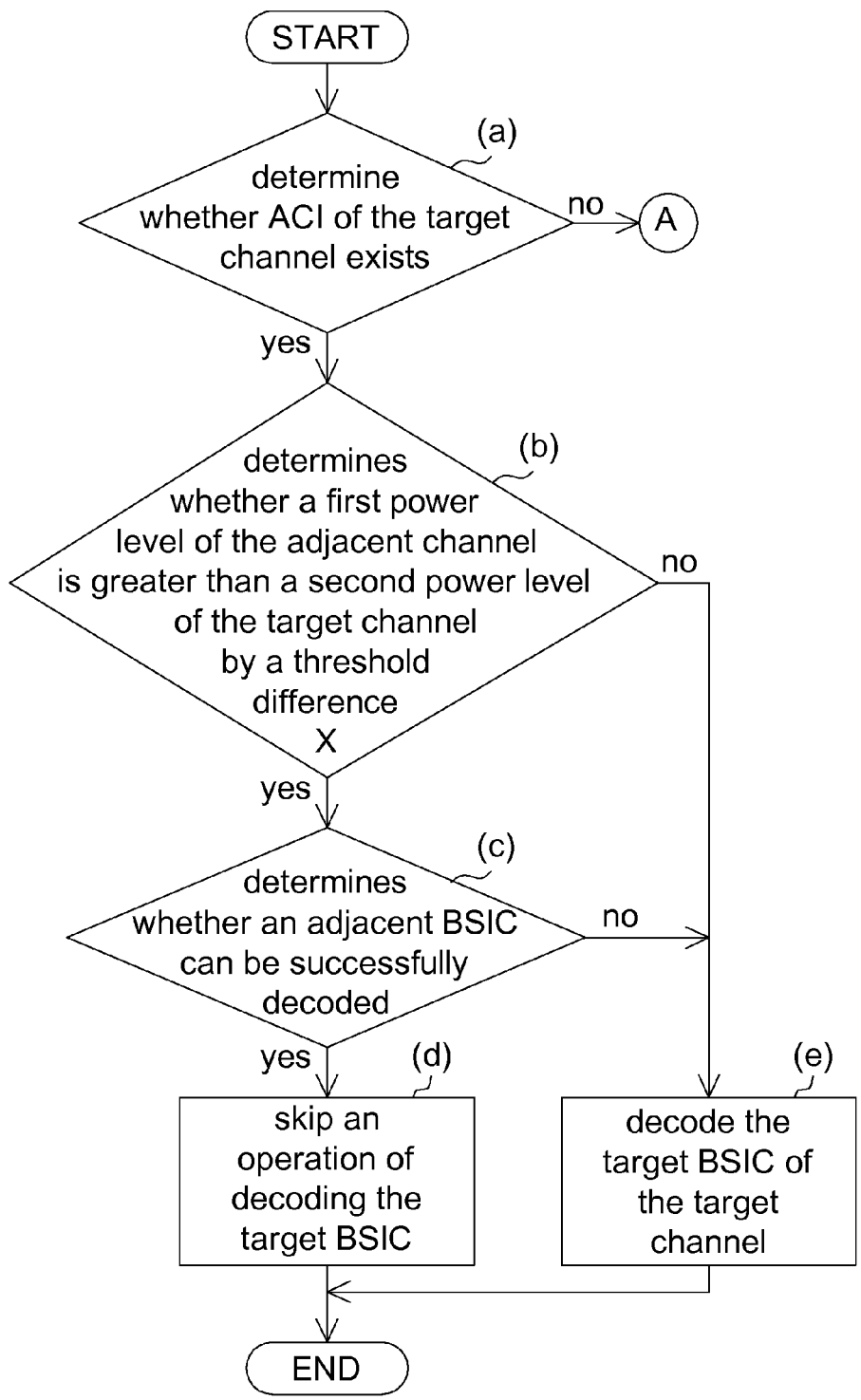
FIG. 2 is a flow chart of the surrounding cell monitoring method according to a first embodiment of the invention.

Referring to FIG. 2, a flow chart of the surrounding cell monitoring method according to the first embodiment of the invention is shown. The surrounding cell monitoring method according to the first embodiment of the invention is applied in the mobile terminal 11a of the communications system 1.

The surrounding cell monitoring method firstly proceeds to step (a), in which the mobile terminal 11a determines whether adjacent channel interference (ACI) of the target channel between the mobile terminal 11a and the base station 12a exists. When the ACI does exist, the surrounding cell monitoring method proceeds to step (b), in which the mobile terminal 11a further determines whether a first power level of the adjacent channel is greater than a second power level of the target channel by a threshold difference X, wherein the threshold difference X is relevant to a BSIC (Base Station Identity Code) decoding ability of the mobile terminal 11a. For example, the BSIC is a code defined in GSM specification for uniquely identifying a base station, and detail disclosure thereof is omitted since the BSIC is a commonly conceivable term in the related art.

For example, the modem employed in the mobile terminal 11a corresponds to a maximum tolerance ACI for successfully decoding the target BSIC corresponding to the target cell. Thus, the threshold difference X can be determined with reference to the maximum tolerable ACI, which is, for example, obtained by means of field testing.

When the first power level of the adjacent channel does not greater than the second power level of the target channel by the threshold difference X, the surrounding cell monitoring method proceeds to step (e), in which the mobile terminal 11a executes the operation of decoding the target BSIC of the target channel.

When the first power level of the adjacent channel does be greater than the second power level of the target channel by the threshold difference X, the surrounding cell monitoring method proceeds to step (c), in which the mobile terminal 11a determines whether an adjacent BSIC of the adjacent channel can be successfully decoded. When the BSIC of the adjacent channel cannot be successfully decoded, the surrounding cell monitoring method also proceeds to step (e), in which the mobile terminal 11a executes the operation of decoding the target BSIC of the target channel.

When the adjacent BSIC of the adjacent channel can be successfully decoded, the surrounding cell monitoring method proceeds to step (d), in which the mobile terminal 11a skips an operation of decoding the target BSIC. Based on the above, it can be obtained that the surrounding cell monitoring method according to the first embodiment is configured to selectively skip the operation of decoding the target BSIC with reference to the power levels of the ACI channel and the target channel, and whether the adjacent BSIC can be successfully decoded. Thus, the surrounding cell monitoring method according to the first embodiment is able to achieve proper power management of the mobile terminal 11a by means of skipping the operation of decoding the target BSIC and accordingly preventing the mobile terminal 11a from keeping decoding the target BSIC, which is hardly decodable under the condition that the criteria recited in steps (b) and (c) are both satisfied.

Figure 3:
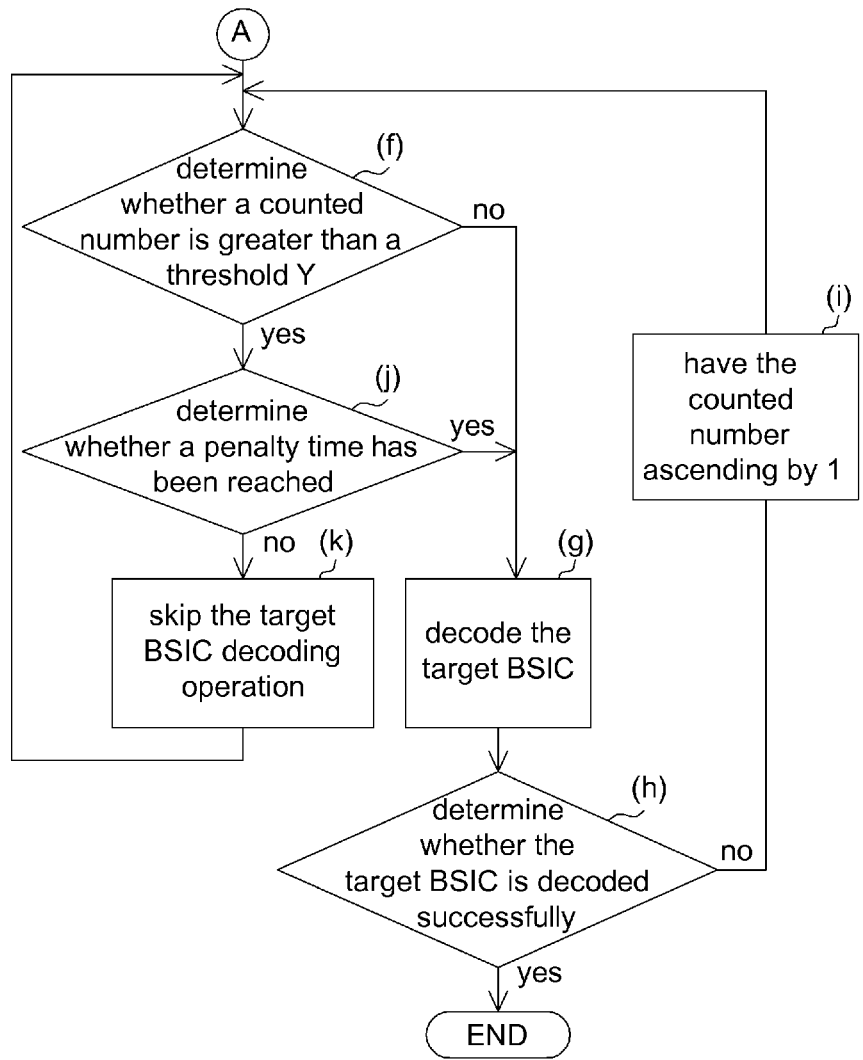
FIG. 3 is a flow chart of the surrounding cell monitoring method according to the first embodiment of the invention under the condition that ACI of the target channel does not exist.

Referring to FIG. 3, a flow chart of the surrounding cell monitoring method according to the first embodiment of the invention is shown. Though only the detailed steps, under the condition that the ACI does exist, of the surrounding cell monitoring method are disclosed in the above paragraphs, the surrounding cell monitoring method according to the first embodiment of the invention is not limited thereto, and could also has corresponding steps executed under the condition that the ACI does not exist, e.g. steps (f), (g), (h), (i), (j), and (k).

After step (a), when the ACI of the target channel does not exist, the surrounding cell monitoring method according to the first embodiment further proceeds to step (f), in which the mobile terminal 11a determines whether a counted number, indicating times for trying to decoding the target BSIC, is greater than a threshold Y, wherein the threshold Y could be any natural number, e.g. 5.

When the counted number is not greater than the threshold Y, the surrounding cell monitoring method proceeds to step (g), in which the mobile terminal 11a accordingly decodes the target BSIC. Then the surrounding cell monitoring method proceeds to step (h), in which the mobile terminal 11a determines whether the target BSIC is decoded successfully; if so, the surrounding cell monitoring method proceeds to an end. When the target BSIC is not decoded successfully, the surrounding cell monitoring method proceeds to step (i), in which the mobile terminal 11a has the counted number ascending by 1 and goes back to step (f) for once again determining whether the counted number is greater than the threshold Y.

After step (f), when the counted number is greater than the threshold Y, the surrounding cell monitoring method proceeds to step (j), in which the mobile terminal 11a determines whether a penalty time, started from a time point on which the target BSIC was decoded last time, has been reached. For example, the penalty time is set according to the refresh time of the already decoded BSIC, e.g. 30 seconds. When the penalty time has not been reached, the surrounding cell monitoring method proceeds to step (k), in which the mobile terminal 11a skips the target BSIC decoding operation and then goes back to step (f). When the penalty time has been reached, the surrounding cell monitoring method proceeds to step (g).

Based on the above, it can be obtained that the surrounding cell monitoring method according to the first embodiment is further configured to selectively skip the operation of decoding the target BSIC with reference to the times that the mobile terminal 11a has tried to decode the target BSIC. Thus, the surrounding cell monitoring method according to the first embodiment is able to achieve proper power management of the mobile terminal 11a by means of skipping the operation of decoding the target BSIC and accordingly preventing the mobile terminal 11a from keeping decoding the target BSIC, which has been already decoded for several times.

Second Embodiment

The surrounding cell monitoring method according to the second embodiment of the invention is different from that of the first embodiment in that the surrounding cell monitoring method determines whether to execute the operation of decoding the target BSIC according to a counted number, indicating times for trying to decoding the target BSIC.

Figure 4:
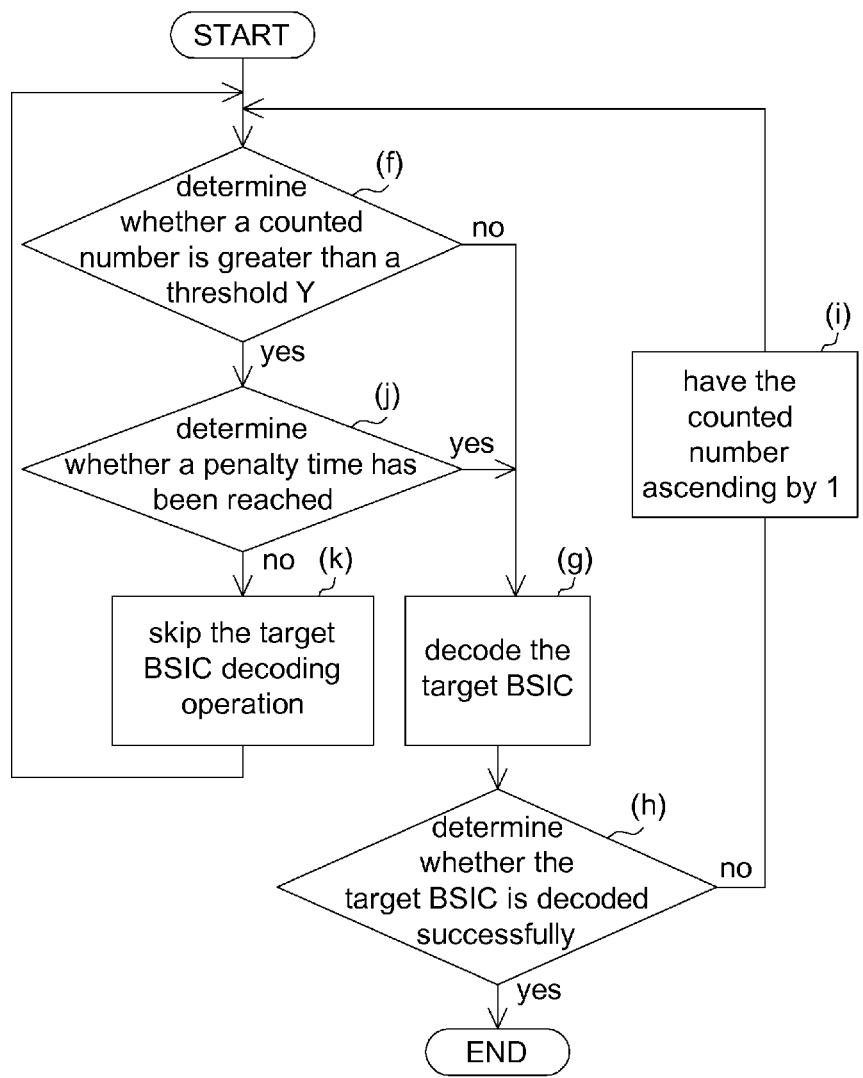
FIG. 4 is a flow chart of the surrounding cell monitoring method according to a second embodiment of the invention.

Referring to FIG. 4, a flow chart of the surrounding cell monitoring method according to the second embodiment is shown. In detail, the surrounding cell monitoring method includes steps (f)-(k), similar to the corresponding steps shown in FIG. 3, but does not execute step (a) beforehand. In other words, the surrounding monitoring method according to the second embodiment achieves the monitoring operation without the operation of determining whether the ACI of the target channel exists.

Thus, the surrounding cell monitoring method according to the second embodiment is able to achieve proper power management of the mobile terminal 11a by means of skipping the operation of decoding the target BSIC and accordingly preventing the mobile terminal 11a from keeping decoding the target BSIC, which has been already decoded for several times but barely decodable.

Third Embodiment

The surrounding cell monitoring method according to the third embodiment of the invention is different from that of the first embodiment in that the surrounding cell monitoring method according to the third embodiment is further configured to establish a BSIC database, so that the surrounding cell monitoring method according to the third embodiment is able to obtain the target BSIC by means of looking up the BSIC database before actually carrying out BSIC decoding operation.

Every piece of BSIC information stored in the BSIC database is valid for only an effective period of time. For example, the effective period is determined according to the refresh time of the decoded BSIC, e.g. 30 seconds. The surrounding cell monitoring method according to the third embodiment is, for example, applied in a mobile terminal 11a with multiple SIMs. Thus, the mobile terminal 11a is able to communicate with a number of cells through a number of target channels via the respective multiple SIMs. For example, every piece of BSIC information stored in the BSIC database is obtained when surrounding cell monitoring operations, corresponding to any one of the multiple SIMs, take place. As such, the BSICs, decoded in surrounding cell monitoring operations corresponding to any of the multiple SIMs and stored in the BSIC database, can be referred to by other SIMs. Therefore, the surrounding cell monitoring method according to the third embodiment is able to prevent the mobile terminal 11a from repeatedly executing BSIC decoding operations on those BSICs, already decoded in surrounding cell monitoring operations corresponding to other SIMs of the mobile terminal 11a.

Figure 5:
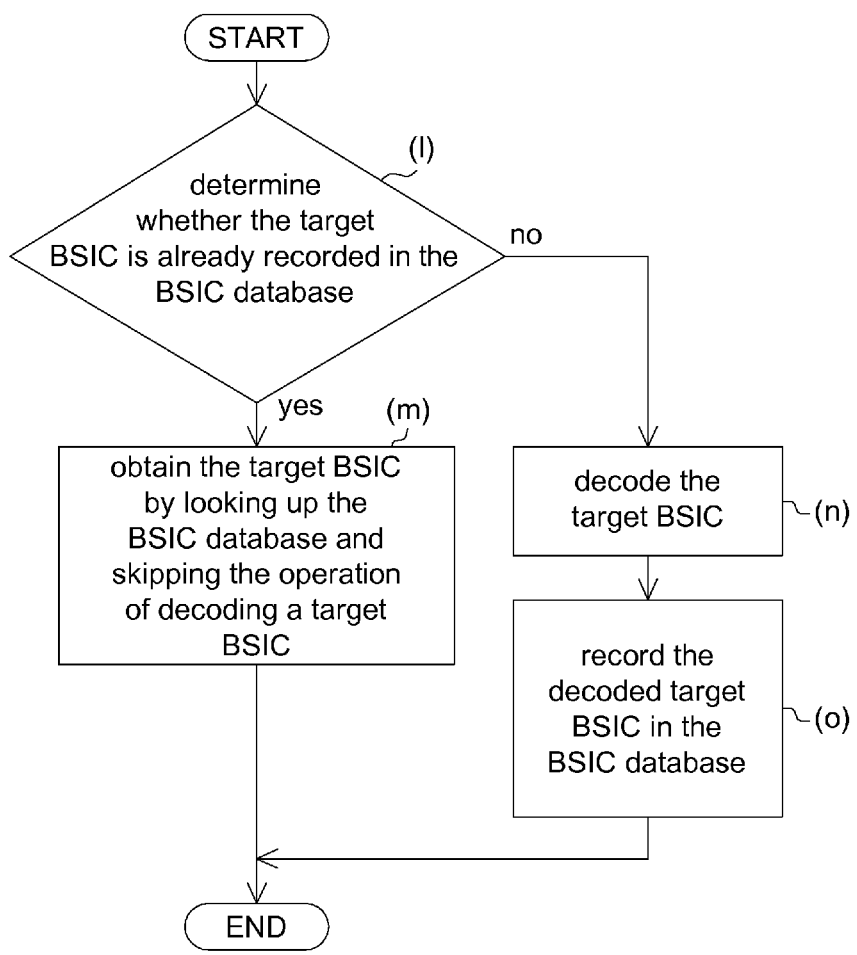
FIG. 5 is a flow chart of the surrounding cell monitoring method according to a third embodiment of the invention.

Referring to FIG. 5, a flow chart of the surrounding cell monitoring method according to the third embodiment of the invention is shown. In detail, the surrounding cell monitoring method according to the third embodiment further includes steps (l), (m), (n), and (o). Firstly, the surrounding cell monitoring method proceeds to step (l), in which the mobile terminal 11a determines whether the target BSIC is already recorded in the BSIC database. When the target BSIC is already recorded in the BSIC database, the surrounding cell monitoring method proceeds to step (m), in which the mobile terminal 11a obtains the target BSIC in a manner of looking up the BSIC database and skipping the operation of decoding a target BSIC accordingly.

When the target BSIC is not recorded in the BSIC database, the surrounding cell monitoring method proceeds to step (n), in which the mobile terminal 11a decodes the target BSIC to obtain the target BSIC. Then the surrounding cell monitoring method proceeds to step (o), in which the mobile terminal 11a records the decoded target BSIC in the BSIC database.

For example, steps (a)-(e) of the surrounding cell monitoring method according to the first embodiment can be regarded as sub-steps of step (n) of the surrounding cell monitoring method according to the third embodiment, so that the steps recited in the surrounding cell monitoring methods according to the first, and the third embodiments can be integrated into a single flow. Similarly, steps (f)-(k) together with steps (a)-(e) can also be regarded as sub-steps of step (n) of the surrounding cell monitoring method according to the third embodiment, so that the steps recited in the surrounding cell monitoring methods according to the first to the third embodiments can all be integrated into a single flow.

The surrounding cell monitoring method according to the above mentioned embodiments of invention could be applied in a mobile terminal, comprising a subscriber identity module (SIM) wirelessly communicating with a cell through a target channel. The surrounding cell monitoring method is capable of selectively skipping the operation of decoding the target BSIC of the target channel under the circumstance that the ACI of the target channel is high and the adjacent BSIC corresponding to the ACI channel can be decoded successfully. Thus, in comparison to conventional surrounding cell monitoring methods, the surrounding cell monitoring method is capable of selectively skipping the operation of target BSIC decoding and enhancing power performance of the mobile terminal using thereof.

While the invention has been described by way of example and in terms of preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A surrounding cell monitoring method applied in a mobile terminal wirelessly communicating with a first cell through a first target channel, the surrounding cell monitoring method comprising:
    determining whether adjacent channel interference (ACI) of the target channel exists;
    determining whether a first power level of the adjacent channel is greater than a second power level of the target channel by a threshold difference when the ACI exists;
    determining whether an adjacent BSIC (Base Station Identity Code) of the adjacent channel can be decoded when the first power level is greater than the second power level by the threshold difference; and
    skipping an operation of decoding a target BSIC of the target channel when the adjacent BSIC of the adjacent channel can be decoded successfully.

2. The surrounding cell monitoring method according to claim 1, further comprising:
    decoding the target BSIC when the adjacent BSIC of the adjacent channel cannot be decoded.

3. The surrounding cell monitoring method according to claim 1, further comprising:
    decoding the target BSIC when the first power level is not greater than the second power level by the threshold difference.

4. The surrounding cell monitoring method according to claim 1, further comprising:
    determining whether a counted number, indicating times for trying to decoding the target BSIC, is greater than a threshold when the ACI of the target channel does not exist;
    decoding the target BSIC when the counted number is not greater than the threshold;
    determining whether the target BSIC is decoded successfully; and
    having the counted number ascending by 1 when the target BSIC is not decoded successfully.

5. The surrounding cell monitoring method according to claim 4, wherein after the step of having the counted number ascending by 1, the surrounding cell monitoring method proceeds to the step of determining whether the counted number is greater than the threshold.

6. The surrounding cell monitoring method according to claim 4, further comprising:
    determining whether a penalty time, started from a time point on which the target BSIC was decoded, has been reached; and skipping the target BSIC decoding operation when the penalty time has not been reached.

7. The surrounding cell monitoring method according to claim 6, further entering the step of decoding the target BSIC when the penalty time has been reached.

8. The surrounding cell monitoring method according to claim 1, further comprising:
   determining whether the target BSIC is recorded in a BSIC database; and
   obtaining the target BSIC in a manner of referencing the BSIC database and skipping the operation of decoding the target BSIC accordingly when the target BSIC is recorded in the BSIC database.

9. The surrounding cell monitoring method according to claim 8, further comprising:
   decoding the target BSIC when the target BSIC is not recorded in the BSIC database; and
   recording the decoded target BSIC in the BSIC database.

10. The surrounding cell monitoring method according to claim 8, every piece of BSIC information stored in the BSIC database is valid for an effective period of time.

11. The surrounding cell monitoring method according to claim 8, wherein the mobile terminal wirelessly communicating with at least a second cell through at least a second target channel, and every piece of BSIC information stored in the BSIC database is obtained when surrounding cell monitoring operations take place.

12. A surrounding cell monitoring method applied in a mobile terminal, wirelessly communicating with a first cell through a first target channel, the surrounding cell monitoring method comprising:
   determining whether a counted number, indicating operation times for trying to decoding a target BSIC (Base Station Identity Code), is greater than a threshold;
   decoding the target BSIC when the counted number is not greater than the threshold;
   determining whether the target BSIC is decoded successfully;
   having the counted number ascending by 1 when the target BSIC is not decoded successfully, wherein, after the step of having the counted number ascending by 1, the surrounding cell monitoring method proceeds to the step of determining whether the counted number is greater than the threshold;
   determining whether a penalty time, started from a time point on which the target BSIC was decoded, has been reached when the counted number is greater than the threshold; and
   skipping the target BSIC decoding operation when the penalty time has not been reached.

13. The surrounding cell monitoring method according to claim 12, further entering the step of decoding the target BSIC when the penalty time has been reached.

14. A surrounding cell monitoring method applied in a mobile terminal, wirelessly communicating with a first cell through a first target channel, the surrounding cell monitoring method comprising:
   determining whether a target BSIC (Base Station Identity Code) is recorded in a BSIC database;
   obtaining the target BSIC in a manner of referencing the BSIC database and skipping the operation of decoding the target BSIC accordingly when the target BSIC is recorded in the BSIC database;
   decoding the target BSIC when the target BSIC is not recorded in the BSIC database; and
   recording the decoded target BSIC in the BSIC database.

15. The surrounding cell monitoring method according to claim 14, wherein the mobile terminal wirelessly communicating with at least a second cell through at least a second target channel, and every piece of BSIC information stored in the BSIC database is obtained when surrounding cell monitoring operations take place.

* * * * *